(12) United States Patent
Kalibjian et al.

(10) Patent No.: US 8,826,024 B2
(45) Date of Patent: Sep. 2, 2014

(54) TRUSTED COMPLIANCE OPERATIONS INSIDE SECURE COMPUTING BOUNDARIES

(75) Inventors: Jeff Kalibjian, Cupertino, CA (US); Vladimir Libershteyn, Cupertino, CA (US); Steven W. Wierenga, Cupertino, CA (US); John W. Clark, Cupertino, CA (US); Susan Langford, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2626 days.

(21) Appl. No.: 11/584,859

(22) Filed: Oct. 23, 2006

(65) Prior Publication Data

US 2008/0098230 A1  Apr. 24, 2008

(51) Int. Cl.
  *H04L 29/06* (2006.01)
  *G06F 21/53* (2013.01)
  *G06F 21/57* (2013.01)

(52) U.S. Cl.
  CPC .......... *G06F 21/57* (2013.01); *G06F 21/53* (2013.01)
  USPC .......................................... 713/176

(58) Field of Classification Search
  None
  See application file for complete search history.

(56) References Cited

U.S. PATENT DOCUMENTS

| | | | | |
|---|---|---|---|---|
| 5,884,312 A * | 3/1999 | Dustan et al. | ......................... | 1/1 |
| 7,296,160 B2 * | 11/2007 | Hiltgen | ......................... | 713/172 |
| 7,383,440 B1 * | 6/2008 | Miller et al. | ................... | 713/171 |
| 7,509,392 B2 * | 3/2009 | Shen et al. | ..................... | 709/215 |

* cited by examiner

*Primary Examiner* — Jeffrey D Popham

(57) ABSTRACT

In one embodiment, a method of implementing trusted compliance operations inside secure computing boundaries comprises receiving, in a secure computing environment, a data envelope from an application operating outside the secure computing environment, the data envelope comprising data and a compliance operation command, verifying, in the secure computing environment, a signature associated with the data envelope, authenticating, in the secure computing environment, the data envelope, notarizing, in the secure computing environment, the application of the command to the data in the envelope, executing the compliance operation in the secure environment; and confirming a result of the compliance operation to a client via trusted communication tunnel.

19 Claims, 10 Drawing Sheets

TRUSTED COMPLIANCE OPERATIONS INSIDE SECURE COMPUTING BOUNDARIES

TECHNICAL FIELD

This application relates to electronic computing, and more particularly to trusted compliance operations inside secure computing boundaries.

BACKGROUND

Computer system security remains an important issue. Recently government and industry groups have established laws and guidelines requiring business entities to enact practices that protect information regarding business operations and infrastructure. Such mandates are now generally referred to as "compliance" initiatives.

Examples of government legislated compliance include Sarbanes Oxley, which mandates protection of public company financial data, Gramm Leach Bliley, which mandates privacy protection of consumer information held by public and private companies, and the Federal Information Security Management Act, which mandates practices for protecting government IT infrastructure).

Examples of industry mandated compliance include the North American Reliability Council Critical Infrastructure Program (NERC CIP), which mandates protection of power generation, transmission and distribution facilities control systems, American Gas Association (AGA 12), which mandates protection of gas and oil pipeline control systems, and the Payment Card Industry Data Security Standard (PCI DSS), which mandates protection of systems managing point of sale/credit card transactions.

Computer systems which may be used to implement such compliance initiatives may find utility.

DETAILED DESCRIPTION

Described herein are exemplary systems and methods for trusted compliance operations inside secure computing boundaries. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
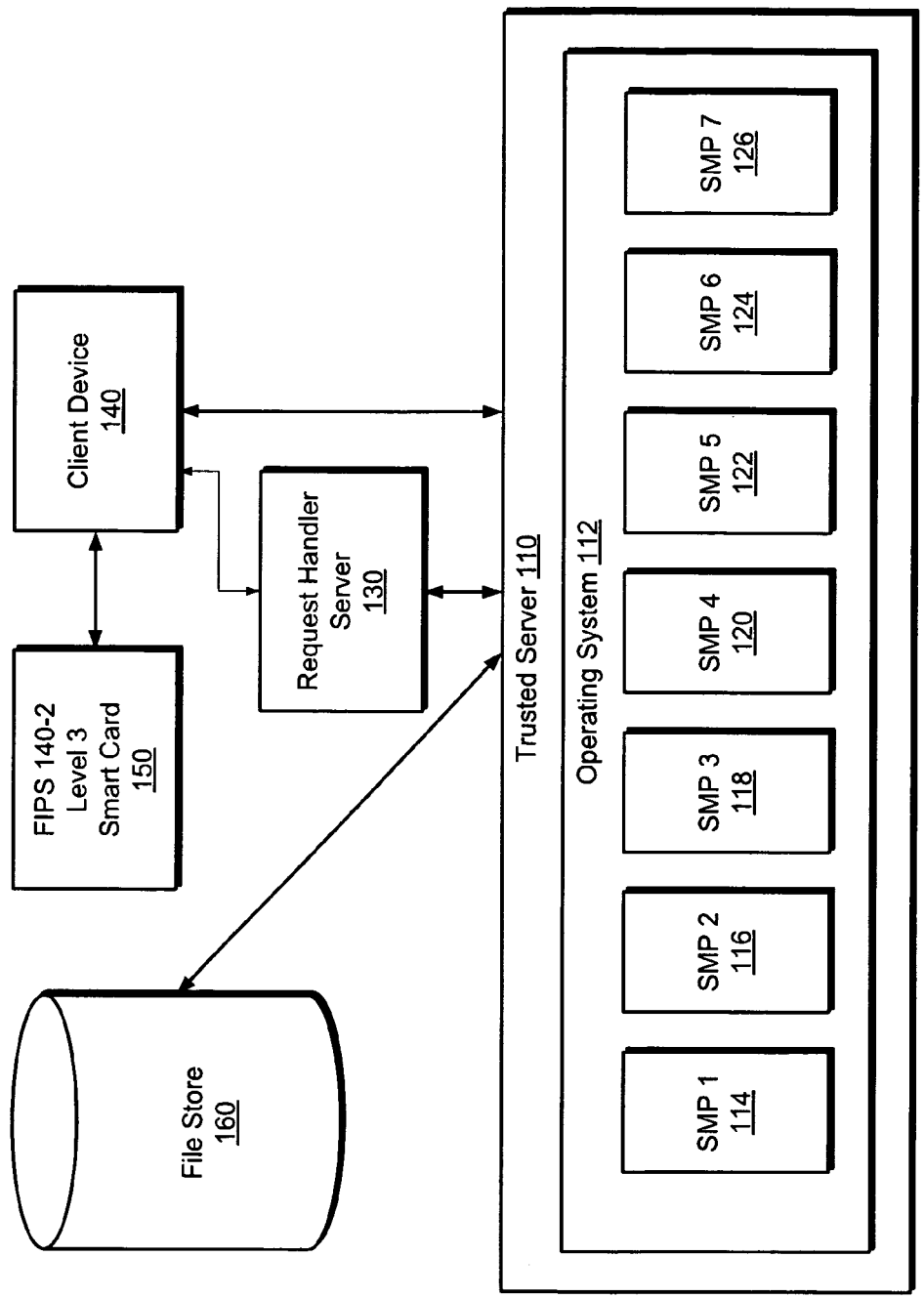
FIG. 1 is a schematic illustration of a networked computing system architecture configured to implement trusted compliance operations inside secure computing boundaries.

FIG. 1 is a schematic illustration of a networked computing system architecture configured to implement trusted compliance operations inside secure computing boundaries. Referring to FIG. 1, in one embodiment, a system 100 comprises a trusted server 110, a request handler server 130, a client device 140, a smart card 150, and a file store 160. These client device 140, request handler server 130, trusted server 110 and file store 160 may be coupled by one or more communication links such as, e.g., an electronic communication network.

In one embodiment, computer system 100 implements a secure computing environment. For example, computer system 100 may implement trust methodologies that comply with level 3 or level 4 of the Federal Information Processing Standards Publications (FIPS PUBS) 140-1 and 140-2 issued by the National Institute of Standards and Technology as described in commonly assigned, co-pending patent application Ser. No. 11/125,458 entitled, Secure Circuit Assembly, filed May 10, 2005, the disclosure of which is hereby incorporated by reference in its entirety. The system may also implement a secure initialization paradigm described in commonly assigned U.S. Pat. No. 6,378,072, the disclosure of which is also incorporated herein by reference in its entirety.

In one embodiment a trusted cryptographic application layer runs on top of a secure operating system to provide security services the secure data log collection application will utilize as described commonly assigned and co-pending patent application Ser. No. 11/177,715 entitled, Policy Based Cryptographic Application Programming Interface Deployed in Secure Memory, filed Jul. 8, 2005, the disclosure of which is hereby incorporated by reference in its entirety.

The operating system 112 of trusted server 110 may establish a plurality of memory partitions 114, 116, 118, 120, 122, 124, 126 since it is common Criteria certified at EAL (Evaluation Assurance Level) level 5 and above. Processes executing on trusted server 110 are confined to their respective memory partitions. Similarly smart card 150 may implement security operations in accord with the FIPS 140 standard and maybe used by an insecure client device to securely communicate with the trusted server by forming secure envelopes using cryptographic operations like digital signatures and encryption.

Request handler server 130 and client device 140 may be implemented as computing devices. For example, request handler server 130 may be implemented as a server computer. Client device 140 may be implemented as a computer, personal digital assistant (PDA) or other computing device. File store 160 may be implemented as one or more storage device(s) which may be dedicated to trusted server 110, or which may be shared between trusted server 110 and other computing devices. For example, file store 160 may be implemented as a network attached storage (NAS) device or a storage area network (SAN).

Figure 2:
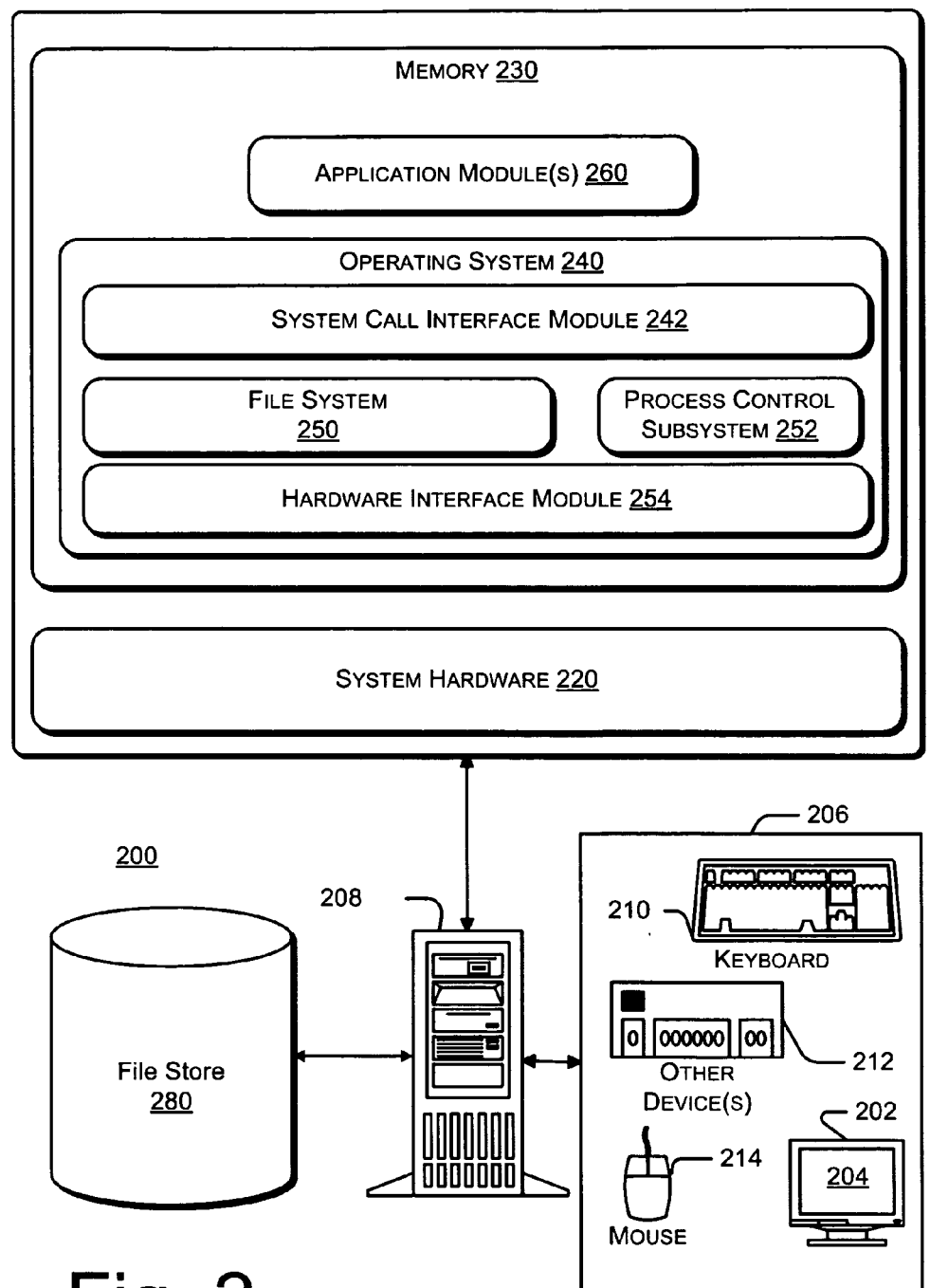
FIG. 2 is a schematic illustration of a schematic illustration of a computing system configured to implement trusted compliance operations inside secure computing boundaries.

FIG. 2 is a schematic illustration of an exemplary computer system 200 configured to implement trusted compliance operations inside secure computing boundaries, such as may be used to implement trusted server 110, request handler server 130, or client device 140. The computer system 200 may include a computer 208 and one or more accompanying input/output devices 206 including a display 202 having a screen 204, a keyboard 210, other I/O device(s) 212, and a mouse 214. The other device(s) 212 can include a touch screen, a voice-activated input device, a track ball, and any other device that allows the system 200 to receive input from a developer and/or a user. The computer 208 includes system hardware 220 and random access memory and/or read-only memory 230. A file store 280 may be communicatively connected to computer 208. File store 280 may be internal such as, e.g., one or more hard drives, or external such as, e.g., one or more external hard drives, network attached storage, or a separate storage network.

Memory 230 includes an operating system 240 for managing operations of computer 208. In one embodiment, operating system 240 includes a hardware interface module 254 that provides an interface to system hardware 220. In addition, operating system 240 includes a file system 250 that manages files used in the operation of computer 208 and a process control subsystem 252 that manages processes executing on computer 208. Operating system 240 further includes a system call interface module 242 that provides an interface between the operating system 240 and one or more application modules and/or libraries.

In operation, one or more application modules 260 and/or libraries executing on computer 208 make calls to the system call interface module 242 to execute one or more commands on the computer's processor. The system call interface module 242 invokes the services of the file system 250 to manage the files required by the command(s) and the process control subsystem 252 to manage the process required by the command(s). The file system 250 and the process control subsystem 252, in turn, invoke the services of the hardware interface module 254 to interface with the system hardware 220.

The particular embodiment of operating system 240 is not critical to the subject matter described herein. However the operating system must have achieved a Common Criteria evaluation of EAL 5 or greater to insure processes can operate in secure memory partitions. Operating system 240 may be embodied as a UNIX operating system or any derivative thereof (e.g., Linux, Solaris, etc.) or as a Windows® brand operating system. In one embodiment, computer system 200 implements a secure computing environment. For example, computer system 200 may implement security techniques that comply with level 3 or level 4 of the Federal Information Processing Standards Publications (FIPS PUBS) 140-1 and 140-2 issued by the National Institute of Standards and Technology.

Figure 3:
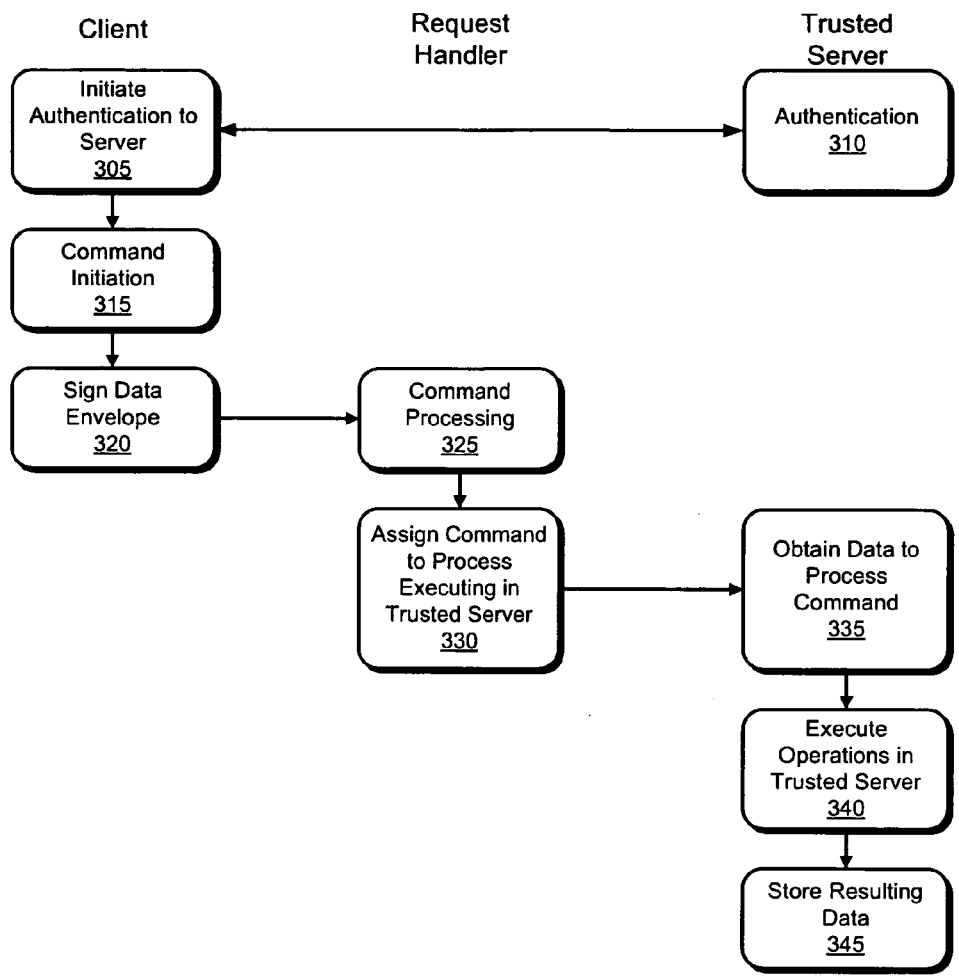
FIG. 3 is a flowchart illustrating operations in one embodiment of a method to implement trusted compliance operations inside secure computing boundaries.

Operation of one embodiment of a system for trusted compliance operations inside secure computing boundaries will be explained with reference to FIGS. 3-9. FIG. 3 is a flowchart that provides an overview of operations in one embodiment of a method to implement trusted compliance operations inside secure computing boundaries. Referring to FIG. 3, at operation 305 the client 110 initiates an authentication process to authenticate itself, e.g., using smartcard 150, to the trusted server 110. Similarly, at operation 310 trusted server 110 implements an authentication process to authenticate client 140. In one embodiment a secure communication tunnel may be established between trusted server 110 and client device 140.

At operation 315 the client initiates a command, and at operation 320 the command is packaged in a data envelope which is signed by smart card 150 and forwarded to request handler server 130. At operation 325 the request handler server may perform command processing, and at operation 330 the request handler server 130 assigns the command to a process executing in the trusted server 110. For example, the request handler server 130 may assign the command to a process executing in a specific memory partition of trusted server 110.

At operation 335 the trusted server 110 obtains data necessary to process the command in the trusted server. For example, the trusted server 110 may obtain the data from the data envelope assembled by the client device 140. Alternatively, or in addition, the trusted server 110 may retrieve data from data store 160 and move the retrieved data into the secure memory partition in which the command is being processed. At operation 340 the command operations are executed within a secure memory partition of the trusted server. In some embodiments the data envelope may be verified in the trusted server 110. After the command is executed in the trusted server 110, the resulting data may be returned to the file store 160. Optionally, the processing results may be communicated back to the client 140, e.g., via a communication link such as an encrypted tunnel.

Methods associated with specific operations will be explained with reference to FIGS. 4A-9. In one embodiment, compliance data evidence is established with a check-in operation. After data is established in the system it should not be subject to alteration. Further, evidence of operations performed on the data should not be subject to alteration.

In one embodiment the system implements a digital signature technology in secure hardware (FIPS 140-2) and trusted memory partitions (Common Criteria EAL 5+). The entity performing the check-in operation first digitally signs the compliance data and any associated comments using a FIPS 140-2 Level 3 Smart Card 150. An associated secure time value may also be signed at this juncture. The data is then sent to the trusted server where the signing entity may be authenticated to determine whether the signing entity has approval for the operations being performed. The entire data set (compliance data, any associated comments, time, check-in entity digital signature) is then digitally signed by the trusted server 110. This final signature herein will be referred to as notarization.

Figure 4A:
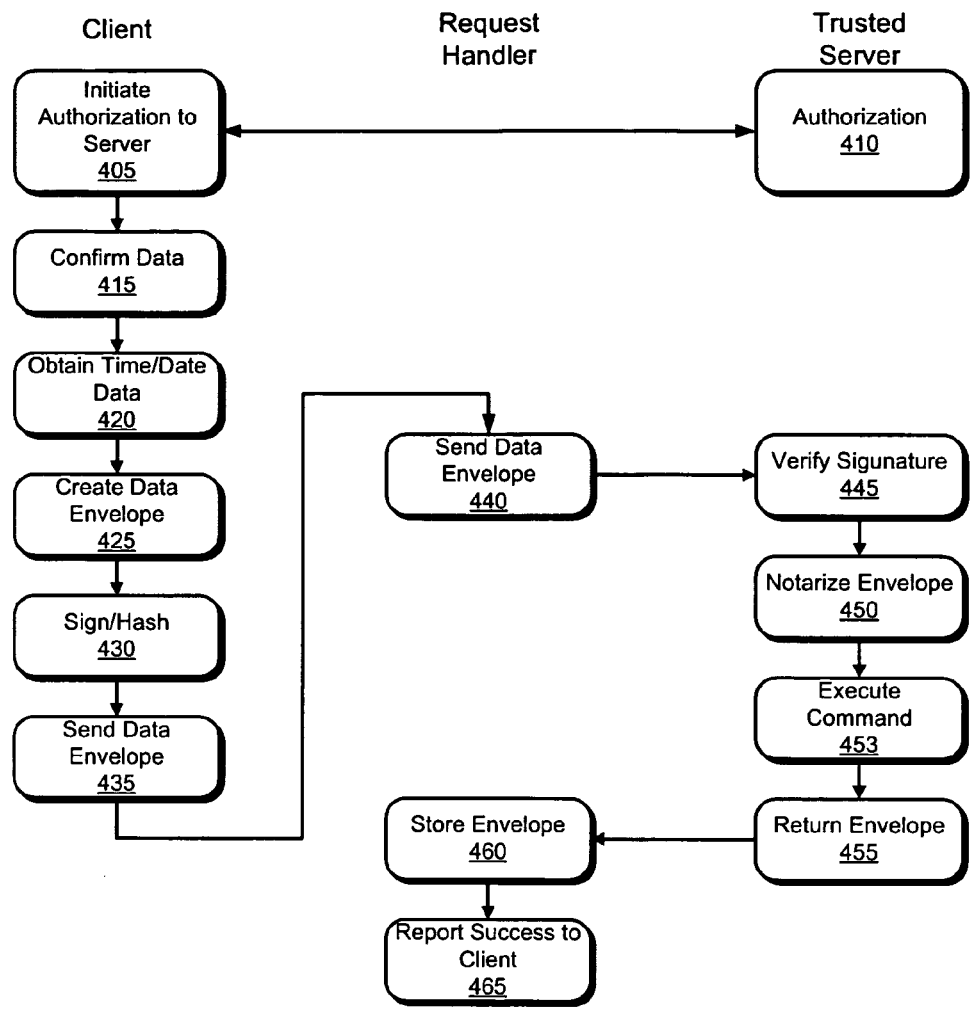
FIG. 4A is a flowchart illustrating operations in one embodiment of a method to check-in data in a system to implement trusted compliance operations inside secure computing boundaries.

FIG. 4A is a flowchart illustrating operations in one embodiment of a method to check-in data in a system to implement trusted compliance operations inside secure computing boundaries. Referring to FIG. 4A, at operation 405 the client 110 initiates an authentication process to authenticate itself, e.g., using smartcard 150, to the trusted server 110.

Similarly, at operation 410 trusted server 110 implements an authentication process to authenticate client 140. In one embodiment a secure communication tunnel may be established between trusted server 110 and client device 140.

At operation 415 a user at the client initiates a check-in operation. The user check-in operation may include data set such as, e.g., compliance data, and comments or other information generated by a user of the system. The user confirms the data and, at operation 420 the client obtains current time/data data from the request handler server 130.

At operation 425 the client creates a data envelope containing the data and additional information such as, e.g., data type, time/date data, next required data review time, etc. At operation 430 the client generates a hash such as, e.g., a Secure Hash Algorithm (SHA)-256 hash of the data envelope. The client uses the smart card 150 to sign the hash. At operation 435 the client sends the data check-in command and the data envelope to the request handler server 130 for processing.

At operation 440 the request handler server 130 sends the envelope containing the data to be checked-in to the trusted server 110 for processing. Referring briefly to FIG. 1, as described above the various memory partitions in trusted server 110 may be reserved for specific processes. For example, SMP 1 may be reserved to manage check-in processes. Request handler server 130 may maintain a table that tracks which processes are assigned to specific memory partitions in trusted server 110. Request handler server 130 may consult this table to determine which memory partition should receive the data envelope.

At operation 445 the trusted server 110 verifies the digital signature applied to the envelope in operation 430 and verifies that the user who signed it is permitted to check-in this type of data. The trusted server 110 then places the envelope within another envelope with additional information such as, e.g., current time and date information retrieved by the trusted server and signs the envelope with a signing key. This is referred to as 'notarizing' in that the trusted server 110 vouches that it has authenticated a user with smart card authentication credentials who is authorized to check-in this kind of data. It also serves to validate the compliance operation. The trusted server may then perform ancillary processing operations to implement the check-in compliance operation (e.g. storing the notarized data in a database, etc.) at operation 453.

At operation 455 the trusted server 110 returns the notarized envelope to the request handler server 130, which stores (operation 460) the envelope, e.g., by sending the envelope to the file store 160. Optionally, at operation 465 the processing results may be communicated back to the client 140, e.g., via a communication link such as an encrypted tunnel.

Figure 4B:
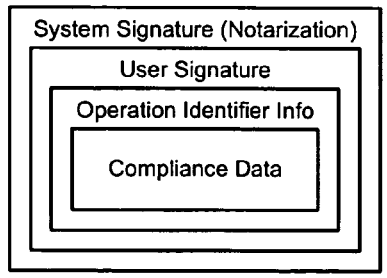
FIG. 4B is a schematic depiction of a data structure to hold compliance data following the operations of FIG. 4A

FIG. 4B is a schematic depiction of a data structure to hold compliance data following the operations of FIG. 4A. Referring to FIG. 4B, at the core of the envelope is the compliance data (and any associated comments, etc.) submitted by the client 110. The compliance data may be wrapped in an envelope that contains information that identifies the type of operation (i.e., check-in) and associated data such as, e.g., the information security level, time stamps, etc. This is wrapped in an envelope that contains the user signature generated in operation 430, which is wrapped in an envelope that contains the system signature generated in operation 450. This data structure may be stored in file store 160.

Once data is checked into the system, it may be reviewed for its accuracy. A reviewer may apply a digital signature to the compliance data reviewed and any associated comments the review may have using a FIPS 140-2 Level 3 Smart Card. An associated secure time value and "next review date" may also be signed at this juncture. The data is then sent to the trusted server 110, where the signing entity is authenticated (i.e., confirmed that they have approval for the review they are performing). The entire data set (compliance data, reviewer comments, time, and reviewer entity digital signature) is then digitally signed by the trusted server. Data may be reviewed by more than one entity and thus, more than one notarized review signature record can be associated with the data.

Figure 5A:
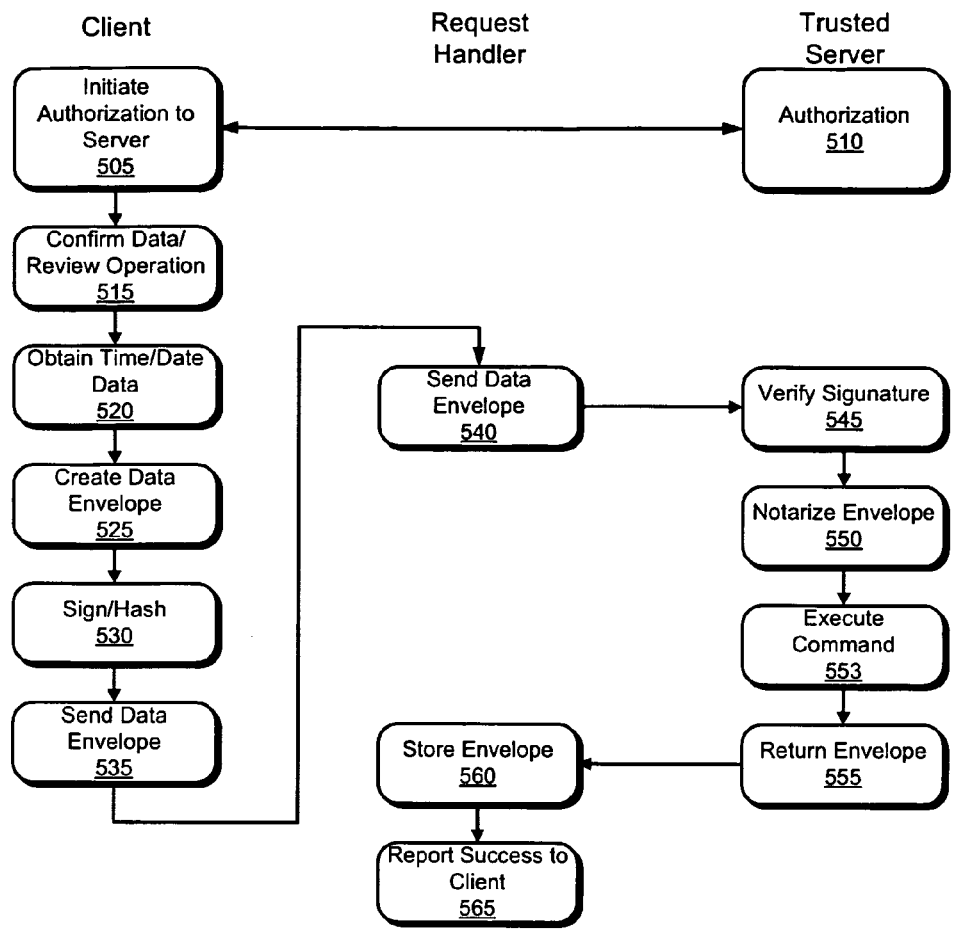
FIG. 5A is a flowchart illustrating operations in one embodiment of a method to review data in a system to implement trusted compliance operations inside secure computing boundaries.

FIG. 5A is a flowchart illustrating operations in one embodiment of a method to review data in a system to implement trusted compliance operations inside secure computing boundaries. Referring to FIG. 5A, at operation 505 the client 110 initiates an authentication process to authenticate itself, e.g., using smartcard 150, to the trusted server 110. Similarly, at operation 510 trusted server 110 implements an authentication process to authenticate client 140. In one embodiment a secure communication tunnel may be established between trusted server 110 and client device 140.

At operation 515 a user at the client initiates a review operation. The data to be reviewed is read and displayed on the client device 140. The user confirms the data presented (and may add comments) and, at operation 520 the client device 140 obtains current time/data data from the request handler server 130.

At operation 525 the client creates a data envelope containing the data envelope for the data that was reviewed (see FIG. 4B) and at operation 530 the client generates a hash such as, e.g., a Secure Hash Algorithm (SHA)-256 hash of the data envelope. The client uses the smart card 150 to sign the hash. At operation 535 the client sends the data review command and the data envelope to the request handler server 130 for processing.

At operation 540 the request handler server 130 sends the envelope containing the data to be reviewed to the trusted server 110 for processing. Referring briefly to FIG. 1, as described above the various memory partitions in trusted server 110 may be reserved for specific processes. For example, SMP 2 may be reserved to manage data review processes. Request handler server 130 may maintain a table that tracks which processes are assigned to specific memory partitions in trusted server 110. Request handler server 130 may consult this table to determine which memory partition should receive the data envelope.

At operation 545 the trusted server 110 verifies the digital signature applied to the envelope in operation 530 and verifies that the user who signed it is permitted to review this type of data. The trusted server 110 then places the envelope within another envelope with additional information such as, e.g., current time and date information retrieved by the trusted server and signs the envelope with a signing key (operation 550). This is referred to as 'notarizing' in that the trusted server 110 vouches that it has authenticated a user with smart card authentication credentials who is authorized to review this kind of data. It also serves to validate the compliance operation. The trusted server may then perform ancillary processing operations to implement the review compliance operation (e.g. storing the reviewers signed comments in a database, etc.) at operation 553.

At operation 555 the trusted server 110 returns the notarized envelope to the request handler server 130, which stores (operation 560) the envelope, e.g., by sending the envelope to the file store 160. Optionally, at operation 565 the processing results may be communicated back to the client 140, e.g., via a communication link such as an encrypted tunnel.

Figure 5B:
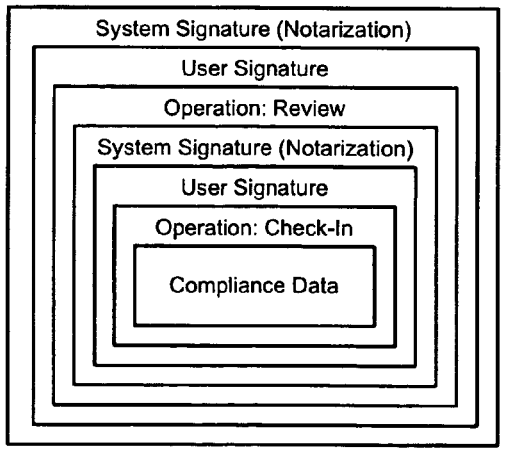
FIG. 5B is a schematic depiction of a data structure to hold compliance data following the operations of FIG. 5A

FIG. 5B is a schematic depiction of a data structure to hold compliance data following the operations of FIG. 5A. Referring to FIG. 5B, at the core of the envelope is the envelope depicted in FIG. 4B. This envelope is wrapped in an envelope that contains information that identifies the type of operation (i.e., review) and associated data such as, e.g., the information security level, time stamps, etc. This is wrapped in an envelope that contains the user signature generated in operation 530, which is wrapped in an envelope that contains the system signature generated in operation 550. This data structure may be stored in file store 160.

Once data has been reviewed by one or more reviewers, the data may be approved. Many compliance regulations require a "sign off" of data by at least on executive officer of an organization. In some cases the executive officer may lack necessary expertise to critically evaluate the data. Thus the review process depicted in FIG. 4A may ensure the data has been reviewed and it is appropriate for the executive(s) to approve. The executive may sign the compliance data approved (and any associated comments he/she might have) using a FIPS 140-2 Level 3 Smart Card. An associated secure time value may also signed at this juncture. The data is then sent to the trusted server 110 where the signing entity is authenticated. The entire data set (compliance data, approver comments, time, approver entity digital signature) is then digitally signed by the trusted server 110. After approval, the executive(s) signature is notarized in the trusted server 110. Note that data may be approved by more than one executive and thus, more than one notarized approval signature record can be associated with the data.

Figure 6A:
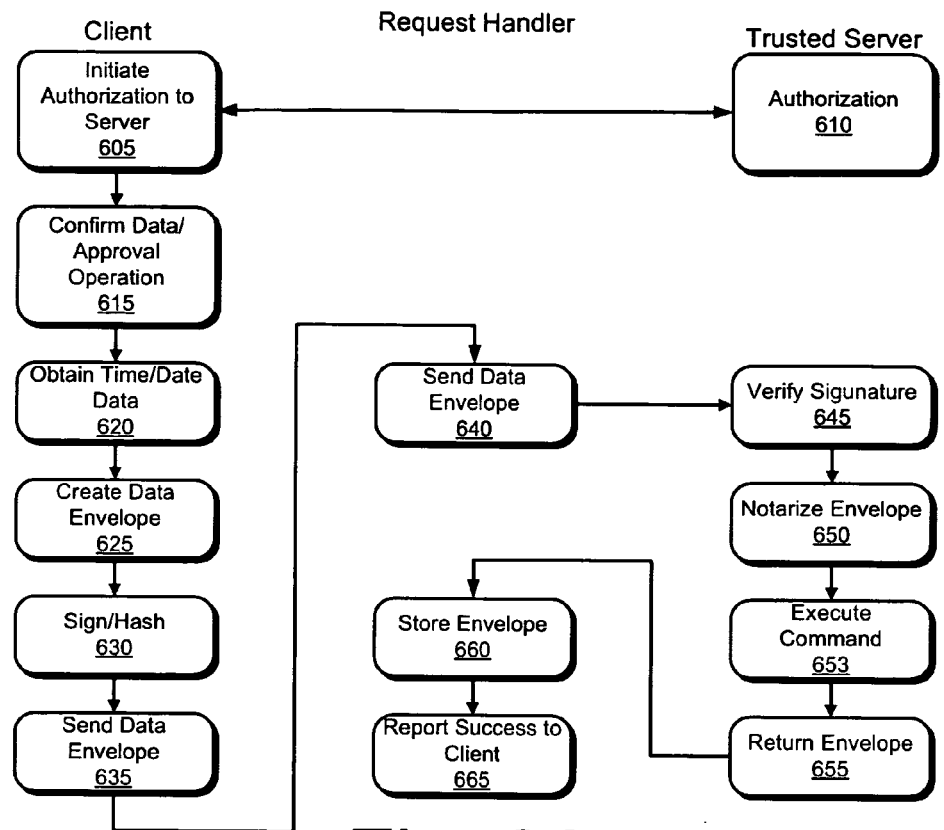
FIG. 6A is a flowchart illustrating operations in one embodiment of a method to approve data in a system to implement trusted compliance operations inside secure computing boundaries.

FIG. 6A is a flowchart illustrating operations in one embodiment of a method to approve data in a system to implement trusted compliance operations inside secure computing boundaries. Referring to FIG. 6A, at operation 605 the client 110 initiates an authentication process to authenticate itself, e.g., using smartcard 150, to the trusted server 110. Similarly, at operation 610 trusted server 110 implements an authentication process to authenticate client 140. In one embodiment a secure communication tunnel may be established between trusted server 110 and client device 140.

At operation 615 a user at the client initiates an data approve operation. The data to be approved is displayed on the client device 140. The user confirms the data presented (and may add comments) and, at operation 620 the client device 140 obtains current time/data data from the request handler server 130.

At operation 625 the client creates a data envelope containing the data envelope for the data that was approved (see FIG. 6B) and at operation 630 the client generates a hash such as, e.g., a Secure Hash Algorithm (SHA)-256 hash of the data envelope. The client uses the smart card 150 to sign the hash. At operation 635 the client sends the data approval command and the data envelope to the request handler server 130 for processing.

At operation 640 the request handler server 130 sends the envelope containing the data to be approved to the trusted server 110 for processing. Referring briefly to FIG. 1, as described above the various memory partitions in trusted server 110 may be reserved for specific processes. For example, SMP 3 may be reserved to manage data approval processes. Request handler server 130 may maintain a table that tracks which processes are assigned to specific memory partitions in trusted server 110. Request handler server 130 may consult this table to determine which memory partition should receive the data envelope.

At operation 645 the trusted server 110 verifies the digital signature applied to the envelope in operation 630 and verifies that the user who signed it is permitted to approve this type of data. The trusted server 110 then places the envelope within another envelope with additional information such as, e.g., current time and date information retrieved by the trusted server and signs the envelope with a signing key (operation 650). This is referred to as 'notarizing' in that the trusted server 110 vouches that it has authenticated a user with smart card authentication credentials who is authorized to approve this kind of data. It also serves to validate the compliance operation. The trusted server may then perform ancillary processing operations to implement the approve compliance operation (e.g. storing the approver's signed comments in a database, etc.) at operation 653.

At operation 655 the trusted server 110 returns the notarized envelope to the request handler server 130, which stores (operation 660) the envelope, e.g., by sending the envelope to the file store 160. Optionally, at operation 665 the processing results may be communicated back to the client 140, e.g., via a communication link such as an encrypted tunnel.

Figure 6B:
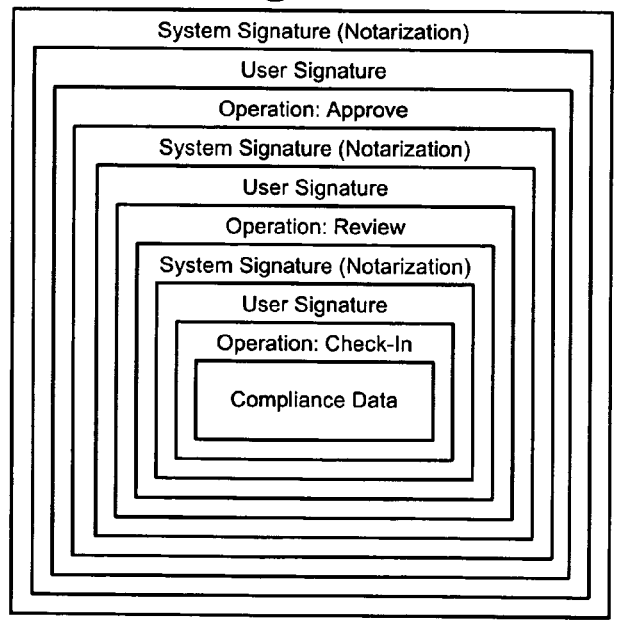
FIG. 6B is a schematic depiction of a data structure to hold compliance data following the operations of FIG. 6A.

FIG. 6B is a schematic depiction of a data structure to hold compliance data following the operations of FIG. 6A. Referring to FIG. 6B, at the core of the envelope is the envelope depicted in FIG. 5B. This envelope is wrapped in an envelope that contains information that identifies the type of operation (i.e., approve) and associated data such as, e.g., the information security level, time stamps, etc. This is wrapped in an envelope that contains the user signature generated in operation 630, which is wrapped in an envelope that contains the system signature generated in operation 650. This data structure may be stored in file store 160.

Some compliance initiatives require organizations to re-examine reviewed and approved data on regular intervals. At check-in this next review data may be automatically calculated and signed. The trusted server 110 may prompt appropriate review personnel (e.g., via e-mail or other means) when the next review date as arrived for checked-in, reviewed, and approved data.

Some compliance initiatives require organizations to audit approved data. A data audit may include an examination of all latest versions, checked-in, reviewed, and approved data at a point in time. To achieve this, pointers to all checked-in, reviewed, and approved data may be collected and the auditor's digital signature may be associated with the pointer data (and any comments the auditor might have regarding that data) using a FIPS 140-2 Level 3 Smart Card. An associated secure time value may also be signed at this juncture. The data is then sent to the trusted server 110 where the signing entity is authenticated (i.e., confirmed that the signing entity has approval for an audit). The entire data set (pointers to latest version checked-in, reviewed, and approved data, auditor comments, time, auditor entity digital signature) is then digitally signed by the trusted server 110.

Figure 7A:
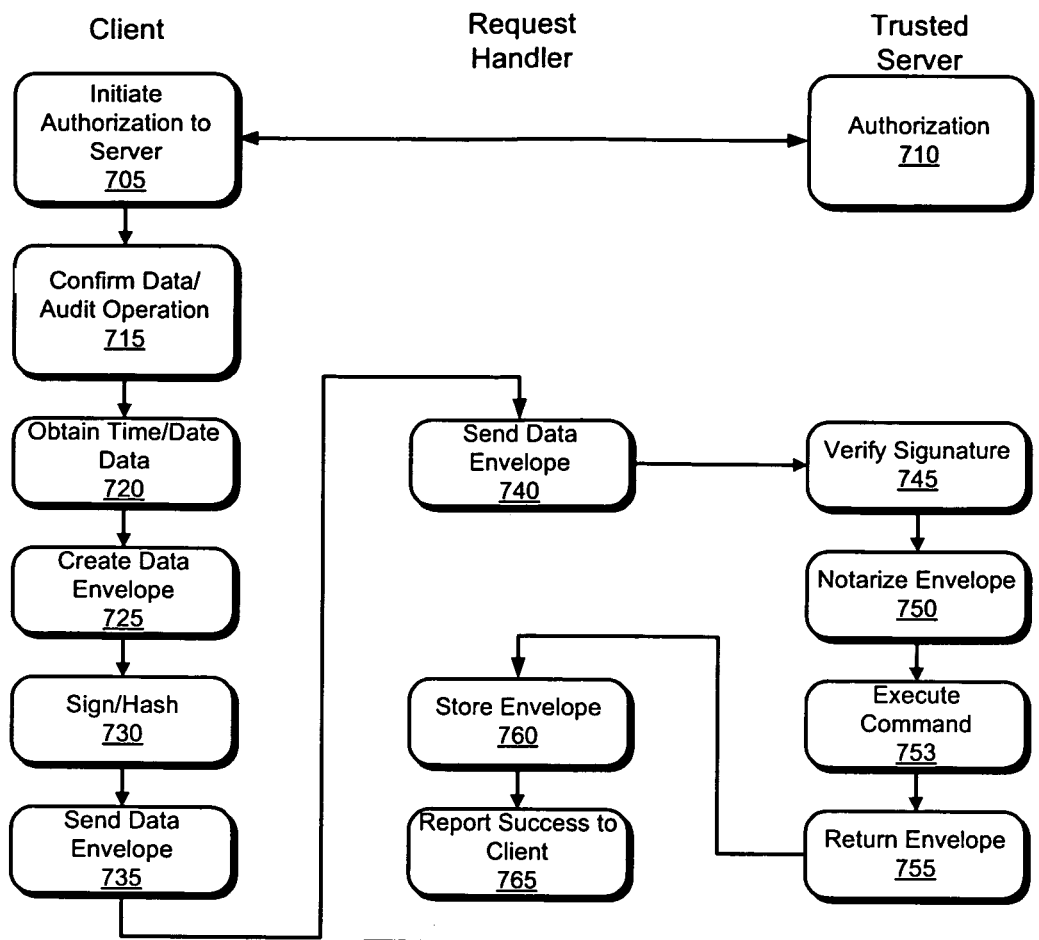
FIG. 7A is a flowchart illustrating operations in one embodiment of a method to audit data in a system to implement trusted compliance operations inside secure computing boundaries.

FIG. 7A is a flowchart illustrating operations in one embodiment of a method to audit data in a system to implement trusted compliance operations inside secure computing boundaries. Referring to FIG. 7A, at operation 705 the client 110 initiates an authentication process to authenticate itself, e.g., using smartcard 150, to the trusted server 110. Similarly, at operation 710 trusted server 110 implements an authentication process to authenticate client 140. In one embodiment a secure communication tunnel may be established between trusted server 110 and client device 140.

At operation 715 a user at the client initiates an audit operation. The data to be audited is displayed on the client device 140. The user confirms the data presented (and may add comments) and, at operation 720 the client device 140 obtains current time/data data from the request handler server 130.

At operation 725 the client creates a data envelope containing the data envelope for the data that was audited (see FIG. 7B) and at operation 730 the client generates a hash such as, e.g., a Secure Hash Algorithm (SHA)-256 hash of the data envelope. The client uses the smart card 150 to sign the hash. At operation 735 the client sends the data audit command and the data envelope to the request handler server 130 for processing.

At operation 740 the request handler server 130 sends the envelope containing the data to be audited to the trusted server 110 for processing. Referring briefly to FIG. 1, as described above the various memory partitions in trusted server 110 may be reserved for specific processes. For example, SMP 4 may be reserved to manage audit processes. Request handler server 130 may maintain a table that tracks which processes are assigned to specific memory partitions in trusted server 110. Request handler server 130 may consult this table to determine which memory partition should receive the data envelope.

At operation 745 the trusted server 110 verifies the digital signature applied to the envelope in operation 730 and verifies that the user who signed it is permitted to audit this type of data. The trusted server 110 then places the envelope within another envelope with additional information such as, e.g., current time and date information retrieved by the trusted server and signs the envelope with a signing key (operation 750). This is referred to as 'notarizing' in that the trusted server 110 vouches that it has authenticated a user with smart card authentication credentials who is authorized to audit this kind of data. It also serves to validate the compliance operation. The trusted server may then perform ancillary processing operations to implement the audit compliance operation (e.g. storing the auditor's signed comments regarding the audit in a database, etc.) at operation 753.

At operation 755 the trusted server 110 returns the notarized envelope to the request handler server 130, which stores (operation 760) the envelope, e.g., by sending the envelope to the file store 160. Optionally, at operation 765 the processing results may be communicated back to the client 140, e.g., via a communication link such as an encrypted tunnel.

Figure 7B:
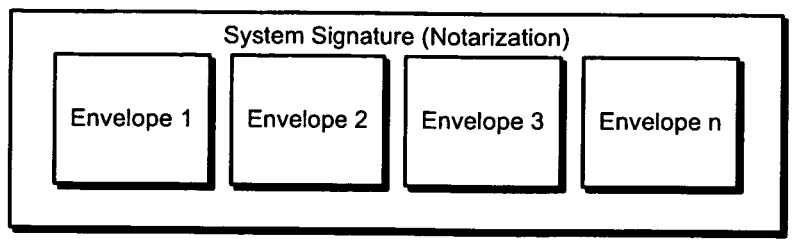
FIG. 7B is a schematic depiction of a data structure to hold compliance data following the operations of FIG. 7A.

FIG. 7B is a schematic depiction of a data structure to hold compliance data following the operations of FIG. 7A. Referring to FIG. 7B, the one or more envelopes containing data structures which were audited by the audit process of FIG. 7A may be wrapped in an envelope that contains the system signature generated in operation 750. This data structure may be stored in file store 160.

Some compliance initiatives require data to be maintained for only for a limited period of time. In the system described herein check-in, review, approval and audit dates are securely recorded. Thus, the system is able to ascertain when data can be deleted. Since an internal policy may require longer retention times, data may not be automatically deleted. Instead, a list of potentially deletable documents may be compiled and presented at appropriate intervals for action to be taken. The entity which checked-in data may be responsible for its deletion. A text list of deleted document titles may be recorded after each document is deleted.

Figure 8:
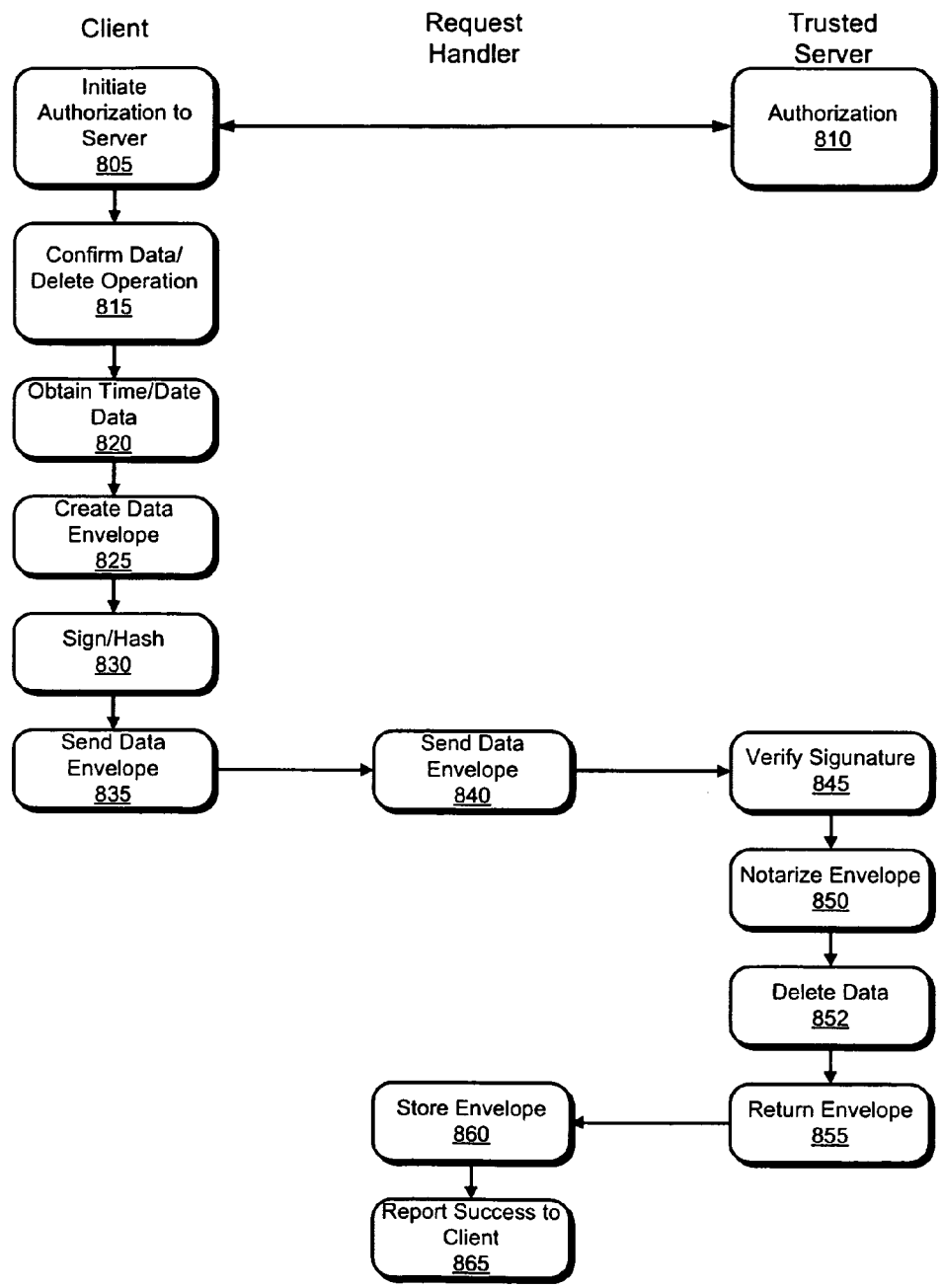
FIG. 8 is a flowchart illustrating operations in one embodiment of a method to delete data in a system to implement trusted compliance operations inside secure computing boundaries.

FIG. 8 is a flowchart illustrating operations in one embodiment of a method to delete data in a system to implement trusted compliance operations inside secure computing boundaries. Referring to FIG. 8, at operation 805 the client 110 initiates an authentication process to authenticate itself, e.g., using smartcard 150, to the trusted server 110. Similarly, at operation 810 trusted server 110 implements an authentication process to authenticate client 140. In one embodiment a secure communication tunnel may be established between trusted server 110 and client device 140.

At operation 815 a user at the client initiates a delete operation. The data to be deleted is displayed on the client device 140. The user confirms the data presented (and may add comments) and, at operation 820 the client device 140 obtains current time/data data from the request handler server 130.

At operation 825 the client creates a data envelope containing the data envelope for the data that is to be deleted and at operation 830 the client generates a hash such as, e.g., a Secure Hash Algorithm (SHA)-256 hash of the data envelope. The client uses the smart card 150 to sign the hash. At operation 835 the client sends the data delete command and the data envelope to the request handler server 130 for processing.

At operation 840 the request handler server 130 sends the envelope containing the data to be deleted to the trusted server 110 for processing. Referring briefly to FIG. 1, as described above the various memory partitions in trusted server 110 may be reserved for specific processes. For example, SMP 7 may be reserved to manage data deletion processes. Request handler server 130 may maintain a table that tracks which processes are assigned to specific memory partitions in trusted server 110. Request handler server 130 may consult this table to determine which memory partition should receive the data envelope.

At operation 845 the trusted server 110 verifies the digital signature applied to the envelope in operation 830 and verifies that the user who signed it is permitted to delete this type of data. The trusted server 110 then places the envelope within another envelope with additional information such as, e.g., current time and date information retrieved by the trusted server and signs the envelope with a signing key (operation 850). This is referred to as 'notarizing' in that the trusted server 110 vouches that it has authenticated a user with smart card authentication credentials who is authorized to delete this kind of data. It also serves to validate the compliance operation. At operation 852 the data identified in the delete operation is deleted from the system. The trusted server may then perform ancillary processing operations associated with the delete compliance operation (e.g. storing a signed list of file names of the data deleted in a database, etc.).

At operation 855 the trusted server 110 returns the notarized envelope to the request handler server 130, which stores (operation 860) the envelope, e.g., by sending the envelope to the file store 160. Optionally, at operation 865 the processing results may be communicated back to the client 140, e.g., via a communication link such as an encrypted tunnel. In one embodiment the system may maintain a list of deleted files in file store 160.

In some embodiments, data that has been checked-in, reviewed and approved may need to be revised. The newly revised document must be associated with prior documents for consistency. This may be accomplished internally via cryptographic or database techniques. With the database approach, pointers to one or more versions of data may be placed in the same database table as the older version(s). In the cryptographic approach, a hash of the last reviewed and approved version may be held in the data structure of the revised document. Comments may be associated with the newly revised document. The newly revised document may be reviewed and approved.

Figure 9:
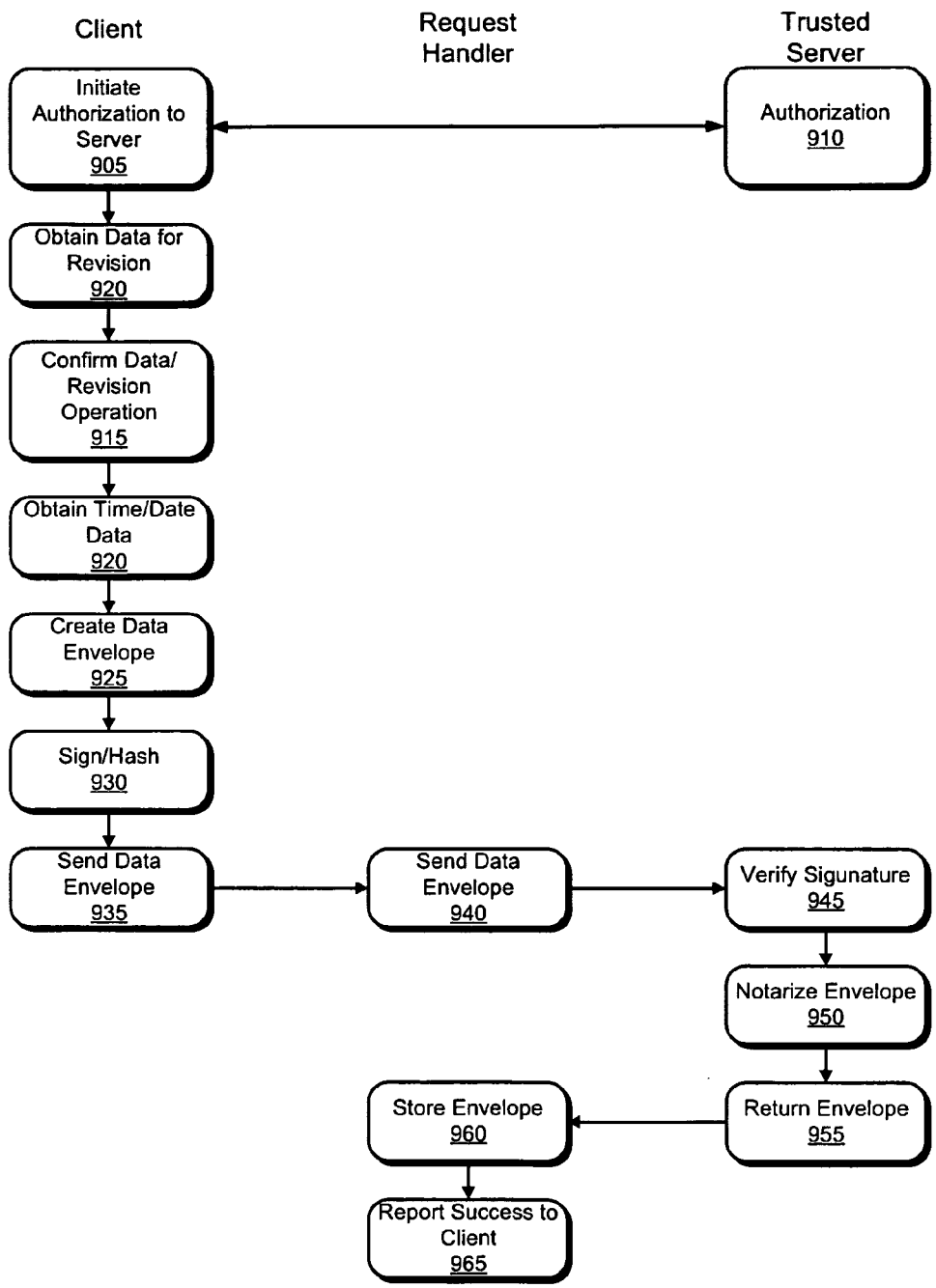
FIG. 9 is a flowchart illustrating operations in one embodiment of a method to version data in a system to implement trusted compliance operations inside secure computing boundaries.

FIG. 9 is a flowchart illustrating operations in one embodiment of a method to revise data in a system to implement trusted compliance operations inside secure computing boundaries. Referring to FIG. 9, at operation 905 the client 110 initiates an authentication process to authenticate itself, e.g., using smartcard 150, to the trusted server 110. Similarly, at operation 910 trusted server 110 implements an authentication process to authenticate client 140. In one embodiment a secure communication tunnel may be established between trusted server 110 and client device 140.

At operation 915 a user at the client initiates a revise operation. The new data is displayed on the client device 140. The user confirms the data presented (and may add comments) and, at operation 920 the client device 140 obtains current time/data data from the request handler server 130.

At operation 925 the client creates a data envelope containing the data envelope for the new data and at operation 930 the client generates a hash such as, e.g., a Secure Hash Algorithm (SHA)-256 hash of the data envelope. The client uses the smart card 150 to sign the hash. At operation 935 the client sends the data revision command and the data envelope to the request handler server 130 for processing.

At operation 940 the request handler server 130 sends the envelope containing the new data to the trusted server 110 for processing. Referring briefly to FIG. 1, as described above the various memory partitions in trusted server 110 may be reserved for specific processes. For example, SMP 5 may be reserved to manage revision processes. Request handler server 130 may maintain a table that tracks which processes are assigned to specific memory partitions in trusted server 110. Request handler server 130 may consult this table to determine which memory partition should receive the data envelope.

At operation 945 the trusted server 110 verifies the digital signature applied to the envelope in operation 930 and verifies that the user who signed it is permitted to revise this type of data. The trusted server 110 then places the envelope within another envelope with additional information such as, e.g., current time and date information retrieved by the trusted server and signs the envelope with a signing key (operation 950). This is referred to as 'notarizing' in that the trusted server 110 vouches that it has authenticated a user with smart card authentication credentials who is authorized to revise this kind of data. It also serves to validate the compliance operation. The trusted server may then perform ancillary processing operations associated with the revision compliance operation (e.g. storing signed comments regarding the revision in a database, etc.).

At operation 955 the trusted server 110 returns the notarized envelope to the request handler server 130, which stores (operation 960) the envelope, e.g., by sending the envelope to the file store 160. Optionally, at operation 965 the processing results may be communicated back to the client 140, e.g., via a communication link such as an encrypted tunnel.

Since the operations described herein are performed in a trusted security boundary, a unique audit record can be created describing every operation performed (e.g., check-in, review, approve, etc.), data involved in the operation, date it was performed on, and who performed it. This list of operations may also be incrementally signed (i.e., notarized) by the system whenever it needs to ejected from the secure boundary for examination or long term storage.

Some embodiments discussed herein may include various operations performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Figure 10:
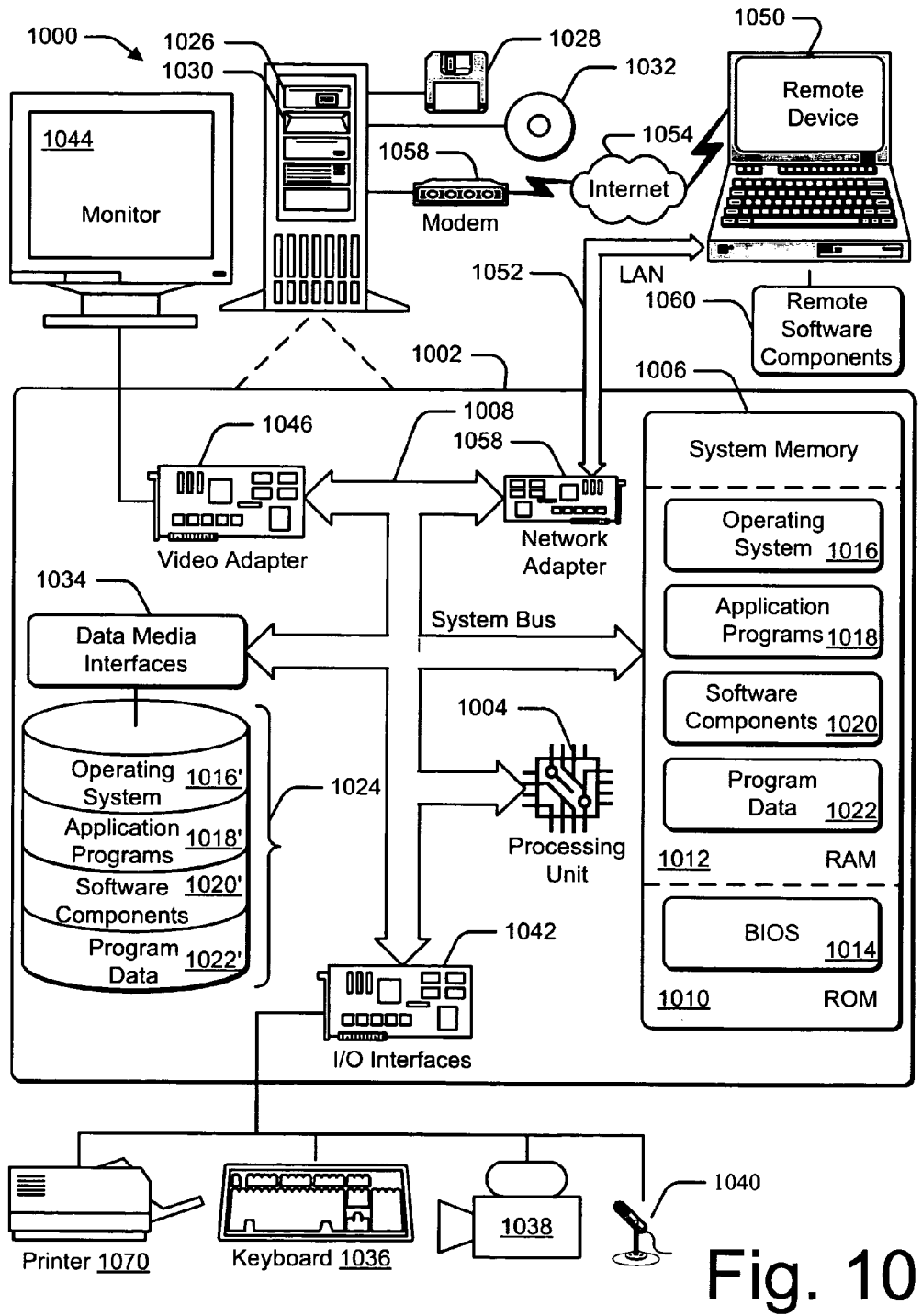
FIG. 10 is a schematic illustration of a computing environment which may be used to implement one or more components of a system to implement trusted compliance operations inside secure computing boundaries.

The various components and functionality described herein are implemented with a number of individual computers. In some embodiments, the computers may comprise a FIPS 140-2 and Common Criteria security certifications. FIG. 10 shows components of typical example of such a computer, referred by to reference numeral 400. The components shown in FIG. 10 are only examples, and are not intended to suggest any limitation as to the scope of the functionality of the invention; the invention is not necessarily dependent on the features shown in FIG. 10.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 10, the components of computer 1000 may include, but are not limited to, a processing unit 1004, a system memory 1006, and a system bus 1008 that couples various system components including the system memory 1006 to the processing unit 1004. The system bus 1008 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 1000 typically includes a variety of computer-readable media. Computer-readable media can be any available media that can be accessed by computer 1000 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1000. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 1006 includes computer storage media in the form of volatile and/or nonvolatile memory such as read only memory (ROM) 1010 and random access memory (RAM) 1012. A basic input/output system 1014 (BIOS), containing the basic routines that help to transfer information between elements within computer 1000, such as during start-up, is typically stored in ROM 1010. RAM 1012 typically contains data and/or program modules that are immediately accessible to and/or presently being operated on by processing unit 1004. By way of example, and not limitation, FIG. 10 illustrates operating system 1016, application programs 1018, other software components 1020, and program data 1022.

The computer 1000 may also include other removable/non-removable, volatile/nonvolatile computer storage media. By way of example only, the computer system of FIG. 10 may include a hard disk drive 1024 that reads from or writes to non-removable, nonvolatile magnetic media, a magnetic disk drive 1026 that reads from or writes to a removable, nonvolatile magnetic disk 1028, and an optical disk drive 1030 that reads from or writes to a removable, nonvolatile optical disk 1032 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1024 is typically connected to the system bus 1008 through a non-removable memory interface such as data media interface 1034, and magnetic disk drive 1026 and optical disk drive 1030 are typically connected to the system bus 1008 by a removable memory interface.

The drives and their associated computer storage media discussed above and illustrated in FIG. 10 provide storage of computer-readable instructions, data structures, program modules, and other data for computer 1000. In FIG. 10, for example, hard disk drive 1024 is illustrated as storing operating system 1016', application programs 1018', software components 1020', and program data 1022'. Note that these components can either be the same as or different from operating system 1016, application programs 1018, software components 1020, and program data 1022. Operating system 1016, application programs 1018, other program modules 1020, and program data 1022 are given different numbers here to illustrate that, at a minimum, they are different copies. A user may enter commands and information into the computer 1000 through input devices such as a keyboard 1036 and pointing device 1038, commonly referred to as a mouse, trackball, or touch pad. Other input devices (not shown) may include a microphone 1040, joystick, game pad, satellite dish, scanner, or the like. These and other input devices are often connected to the processing unit 1004 through an input/output (I/O) interface 1042 that is coupled to the system bus, but may be connected by other interface and bus structures, such as a parallel port, game port, or a universal serial bus (USB). A monitor 1044 or other type of display device is also connected to the system bus 1006 via an interface, such as a video adapter 1046. In addition to the monitor 1044, computers may also include other peripheral output devices (e.g., speakers) and one or more printers 1070, which may be connected through the I/O interface 1042.

The computer may operate in a networked environment using logical connections to one or more remote computers, such as a remote computing device 1050. The remote computing device 1050 may be a personal computer, a server, a router, a network PC, a peer device or other common network node, and typically includes many or all of the elements described above relative to computer 1000. The logical connections depicted in FIG. 10 include a local area network (LAN) 1052 and a wide area network (WAN) 1054. Although the WAN 1054 shown in FIG. 10 is the Internet, the WAN 1054 may also include other networks. Such networking environments are commonplace in offices, enterprise-wide computer networks, intranets, and the like.

When used in a LAN networking environment, the computer 1000 is connected to the LAN 1052 through a network interface or adapter 1056. When used in a WAN networking environment, the computer 1000 typically includes a modem 1058 or other means for establishing communications over the Internet 1054. The modem 1058, which may be internal or external, may be connected to the system bus 1006 via the I/O interface 1042, or other appropriate mechanism. In a networked environment, program modules depicted relative to the computer 1000, or portions thereof, may be stored in the remote computing device 1050. By way of example, and not limitation, FIG. 10 illustrates remote application programs 1060 as residing on remote computing device 1050. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method of implementing trusted compliance operations inside secure computing boundaries, comprising:
   receiving, in a secure computing environment, a data envelope from an application operating outside the secure computing environment, the data envelope comprising data and a compliance operation command to perform an operation selected from an operation set consisting of a check-in operation, a review operation, an approval operation, a versioning operation, a data deletion operation, and an auditing operation;
   verifying, in the secure computing environment, a signature associated with the data envelope;
   authenticating, in the secure computing environment, the data envelope;
   notarizing, in the secure computing environment, the application of the command to the data in the envelope;
   executing the compliance operation in the secure environment; and
   confirming a result of the compliance operation to a client via a trusted communication tunnel.

2. The method of claim 1, wherein receiving, in a secure computing environment, a data envelope from an application operating outside the secure computing environment comprises receiving the data envelope in a secure memory partition.

3. The method of claim 1, wherein authenticating, in the secure computing environment, the data envelope comprises verifying that an entity associated with the signature has authority to implement the compliance command on the data.

4. The method of claim 1, further comprising:
   wrapping compliance data in said data envelope; and
   notarizing, in said secure computing environment, said envelope.

5. The method of claim 4, further comprising:
   transmitting said data envelope to a request handler server; and
   storing said data envelope in a file store.

6. A computer for implementing trusted compliance operations inside secure computing boundaries, comprising:
   a tangible processor;
   a non-transitory tangible memory module including a plurality of memory partitions comprising logic instructions stored on a computer readable medium which, when executed by the processor, configure the processor to:
      receive, in a secure computing environment, a data envelope from an application operating outside the secure computing environment, the data envelope comprising data and a compliance command to perform an operation selected from an operation set consisting of a check-in operation, a review operation, an approval operation, a versioning operation, a data deletion operation, and an auditing operation;
      verify, in the secure computing environment, a signature associated with the data envelope;
      authenticate, in the secure computing environment, the data envelope; and
      execute, in the secure computing environment, the compliance command on the data in the envelope.

7. The computer of claim 6, further comprising logic instructions stored on a computer readable medium which, when executed by the processor, configure the processor to receive the data envelope in a secure memory partition.

8. The computer of claim 6, comprising logic instructions stored on a computer readable medium which, when executed by the processor, configure the processor to verify that an entity associated with the signature has authority to implement the compliance command on the data.

9. The computer of claim 6, comprising logic instructions stored on a computer readable medium which, when executed by the processor, configure the processor to:
   wrap a data set in said data envelope; and
   notarize, in the secure computing environment, said data envelope; thereby establishing a unique data structure to confirm a compliance operation carried out in the trusted security boundary.

10. The computer of claim 9, comprising logic instructions stored on a computer readable medium which, when executed by the processor, configure the processor to:
    transmit said data envelope to a request handler server; and
    store said data envelope in a file store.

11. The computer of claim 6, further comprising logic instructions stored on a computer readable medium which, when executed by the processor, configure the processor to delete data from the system and generate a list of deleted data files.

12. A system for implementing trusted compliance operations inside secure computing boundaries, comprising:
    a client device comprising logic instructions stored on a computer readable medium which, when executed by a processor, configure the client device to:
       initiate an authorization request with a trusted server;
       initiate a compliance command operation on a data set, said compliance command operation being selected from an operation set consisting of a check-in operation, a review operation, an approval operation, a versioning operation, a data deletion operation, and an auditing operation;
       encapsulate the command and the data set within an envelope;
       encrypt the data set;
       apply a digital signature to the envelope and
       transmit the envelope to a request handler server;
    wherein the request handler server comprises logic instructions stored on a computer readable medium which, when executed by the request handler, configure the request handler server to assign the request to a process executing in the trusted server; and
    wherein the trusted server comprises logic instructions stored on a computer readable medium which, when executed by the trusted server, configure the trusted server to:
       verify the encryption signature applied to the envelope at the client device;
       notarize the envelope; and
       execute the compliance operation on the data set.

13. The system of claim 12, further comprising a smart card device which couples to the client device to provide security services to create a secure envelope containing compliance commands and data to be forwarded to the trusted server.

14. The system of claim 12, wherein the envelope generated by the client device comprises:
  said data set;
  a compliance data structure wrapping said data set; and
  a user signature wrapping said compliance data structure.

15. The system of claim 12, wherein the trusted server further comprises logic instructions stored on a computer readable medium which, when executed by the trusted server, configure the trusted server to apply a compliance command to the data set in a memory partition of the trusted server.

16. The system of claim 12, wherein the trusted server further comprises logic instructions stored on a computer readable medium which, when executed by the trusted server, configure the trusted server to wrap the envelope in a digital signature, thereby documenting the compliance operation.

17. The system of claim 16, wherein the trusted server further comprises logic instructions stored on a computer readable medium which, when executed by the trusted server, configure the trusted server to transmit the notarized envelope to the request handler server.

18. The system of claim 17, wherein the request handler server further comprises logic instructions stored on a computer readable medium which, when executed by said request handler server, configure the request handler server' to store the notarized envelope in a file store.

19. The system of claim 17, wherein the request handler server further comprises logic instructions stored on a computer readable medium which, when executed by said request handler server, configure the request handler server to report a successful transaction to the client device.

\* \* \* \* \*

UNITED STATES PATENT AND TRADEMARK OFFICE
CERTIFICATE OF CORRECTION

| | | |
|---|---|---|
| PATENT NO. | : 8,826,024 B2 | Page 1 of 1 |
| APPLICATION NO. | : 11/584859 | |
| DATED | : September 2, 2014 | |
| INVENTOR(S) | : Jeff Kalibjian et al. | |

It is certified that error appears in the above-identified patent and that said Letters Patent is hereby corrected as shown below:

On the Title Page in the print figure, square 845 delete "Sigunature" and insert -- Signature --, therefor.

IN THE DRAWINGS

In Drawing Sheet 4 of 10, Fig. 4A, Square 445, delete "Sigunature" and insert -- Signature --, therefor.

In Drawing Sheet 5 of 10, Fig. 5A, Square 545, delete "Sigunature" and insert -- Signature --, therefor.

In Drawing Sheet 6 of 10, Fig. 6A, Square 645, delete "Sigunature" and insert -- Signature --, therefor.

In Drawing Sheet 7 of 10, Fig. 7A, Square 745, delete "Sigunature" and insert -- Signature --, therefor.

In Drawing Sheet 8 of 10, Fig. 8, Square 845, delete "Sigunature" and insert -- Signature --, therefor.

In Drawing Sheet 9 of 10, Fig. 9, Square 945, delete "Sigunature" and insert -- Signature --, therefor.

IN THE SPECIFICATION

In column 1, line 55, after 'FIG. 4A' insert -- . --, therefor.

In column 1, line 61, after 'FIG. 5A' insert -- . --, therefor.

IN THE CLAIMS

In column 17, line 24, in Claim 18, delete "server'to" and insert -- server to --, therefor.

Signed and Sealed this
Twenty-third Day of February, 2016

Michelle K. Lee
*Director of the United States Patent and Trademark Office*